(12) United States Patent
Acar et al.

(10) Patent No.: US 7,377,167 B2
(45) Date of Patent: May 27, 2008

(54) NONRESONANT MICROMACHINED GYROSCOPES WITH STRUCTURAL MODE-DECOUPLING

(75) Inventors: Cenk Acar, Irvine, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/789,037

(22) Filed: Feb. 27, 2004

(65) Prior Publication Data

US 2005/0199061 A1    Sep. 15, 2005

(51) Int. Cl.
    *G01P 9/04*        (2006.01)
(52) U.S. Cl. .................. 73/504.14; 73/504.12
(58) Field of Classification Search ............ 73/504.02, 73/504.04, 504.12, 504.14, 504.16
    See application file for complete search history.

(56) References Cited

U.S. PATENT DOCUMENTS 5,895,850 A * 4/1999 Buestgens ................ 73/504.12
6,044,707 A * 4/2000 Kato ....................... 73/504.14
6,301,963 B1 * 10/2001 Park ........................ 73/504.12
6,691,571 B2 * 2/2004 Willig et al. ............. 73/504.12
6,742,390 B2 * 6/2004 Mochida et al. ......... 73/504.14

FOREIGN PATENT DOCUMENTS

WO    WO 02/066927    * 8/2002

* cited by examiner

*Primary Examiner*—John E. Chapman
(74) *Attorney, Agent, or Firm*—Myers Dawes Andras & Sherman, LLP

(57) ABSTRACT

A four-degrees-of-freedom (DOF) nonresonant micromachined gyroscope utilizes a dynamical amplification both in the drive-direction oscillator and the sense-direction oscillator, which are structurally decoupled, to achieve large oscillation amplitudes without resonance. The overall dynamical system is comprised of three proof masses. The second and third masses form the sense-direction oscillator. The first mass and the combination of the second and third masses form the drive-direction oscillator. The frequency responses of the drive and sense-mode oscillators have two resonant peaks and a flat region between the peaks. The device is nominally operated in the flat regions of the response curves belonging to the drive and sense-mode oscillators, where the gain is less sensitive to frequency fluctuations. This is achieved by designing the drive and sense anti-resonance frequencies to match.

28 Claims, 9 Drawing Sheets

NONRESONANT MICROMACHINED GYROSCOPES WITH STRUCTURAL MODE-DECOUPLING

BACKGROUND OF THE INVENTION

1. Field of the Invention

The invention relates to micromachined gyroscopes and in particular to four-degrees-of-freedom (DOF) nonresonant micromachined gyroscopes having three proof masses.

2. Description of the Prior Art

Micromachined gyroscopes are projected to become a potential alternative to expensive and bulky conventional inertial sensors. With micromachining processes allowing mass-production of micromechanical systems on a chip together with their control and signal conditioning electronics, low-cost and microsized gyroscopes provide high accuracy rotation measurements leading to an even broader application spectrum, ranging from advanced automotive safety systems and on-chip navigation systems to interactive consumer electronics.

However, due to unfavorable effects of scaling, the current state of the art micromachined gyroscopes require an order of magnitude improvement in performance, stability, and robustness. The conventional micromachined rate gyroscopes operate on the vibratory principle of a two-degrees-of-freedom (DOF) system with a single proof mass suspended by flexures anchored to the substrate, which allow the mass to oscillate in two orthogonal directions, namely the drive and the sense directions. The proof mass is sustained in resonance in the drive direction, and in the presence of an angular rotation, the Coriolis force proportional to the input angular rate, is induced, exciting the proof mass in the sense direction. To achieve high sensitivity, the drive and the sense resonant frequencies are typically designed and tuned to match, and the device is controlled to operate at or near the peak of the response curve. To enhance the sensitivity further, the device is packaged in high vacuum, minimizing energy dissipation due to viscous effects of air surrounding the mechanical structure.

Extensive research has been focused on design of symmetric suspensions and resonator systems for the mode-matching and minimizing temperature dependence. However, especially for lightly-damped devices, the requirement for mode-matching is well beyond fabrication tolerances, and none of the symmetric designs can provide the required degree of mode-matching without active tuning and feedback control. Furthermore, the mechanical interference between the modes, and thus the operation instability and drift, are proportional to the degree of mode-matching. Various devices have been proposed employing independent flexures for driving and sensing mode oscillations to suppress coupled oscillation and the resulting zero-rate drift.

BRIEF SUMMARY OF THE INVENTION

In the illustrated embodiment of the invention, we propose a micromachined gyroscope system utilizing dynamical amplification to achieve large oscillation amplitudes without resonance, while mechanically decoupling the drive direction oscillations from the sense direction oscillations. The overall dynamical system is comprised of three proof masses. The sense-direction oscillator is made up of the second and third masses, designed to amplify response in the sense-mode. The first mass and the combination of the second and third masses form the drive-direction oscillator. The drive and sense-mode oscillators are mechanically decoupled, minimizing instability due to dynamical coupling between the drive and sense modes. The frequency response of both of the drive and sense-mode oscillators have two resonant peaks and a flat region between the peaks. By designing the drive and sense antiresonance frequencies to match, the flat-region frequency band of the oscillators are overlapped, defining the nominal operation region of the device, where the response gain is less sensitive to parameter variations.

Utilizing dynamical amplification in the sense and drive mode oscillators instead of resonance, increased bandwidth and reduced sensitivity to structural and thermal parameter fluctuations and damping changes are achieved. The improved robustness and long-term stability over the operating time of the device is expected to relax control system requirements and tight fabrication and packaging tolerances.

More particularly, the invention is a nonresonant micromachined gyroscope comprising a drive-mode oscillator and a sense-mode oscillator, where the drive-mode oscillator and sense-mode oscillators are mechanically decoupled and employ three interconnected proof masses.

The drive-mode oscillator and sense-mode oscillator utilize dynamical amplification in the drive and sense directions to achieve large oscillation amplitudes without resonance resulting in increased bandwidth and reduced sensitivity to structural and thermal parameter fluctuations and damping changes.

One of the three masses is an intermediate proof mass and another is a sensing element. The drive-mode oscillator and sense-mode oscillator are mechanically decoupled in the drive direction from the sense direction for robustness and long-term stability. The Coriolis force that excites the sensing element is generated by the intermediate proof mass with a larger mass, resulting in larger Coriolis forces for increased sensor sensitivity so that control system requirements and tight fabrication and packaging tolerances are relaxed, mode-matching is eliminated, and instability and zero-rate drift due to mechanical coupling between the drive and sense modes is minimized.

The drive-mode oscillator and sense-mode oscillator include a drive means for driving a mass in a drive direction and a sense means for sensing motion of a mass in a sense direction. The three interconnected masses comprise a first, second and third mass. The first mass is the only mass excited by the drive means. The first mass oscillates in the drive direction and is constrained from movement in the sense direction. The second and third masses are constrained from movement with respect to each other in the drive direction and oscillate together in the drive direction but oscillate independently from each other in the sense direction. The third mass is fixed with respect to the second mass in the drive direction, but is free to oscillate in the sense direction. The first mass acts as a driven mass and the second and third masses act collectively as a passive mass to comprise the drive-mode oscillator. The second and third masses comprise the sense-mode oscillator.

The second mass oscillates in the drive and sense directions to generate rotation-induced Coriolis force that excites the sense-mode oscillator. A sense direction response is derived from the third mass, which comprises the vibration absorber of the sense-mode oscillator, and is detected for measuring the input angular rate.

The drive-mode oscillator and sense-mode oscillator include an electrostatic drive for driving a mass in a drive direction, a capacitive sensor for sensing motion of a mass in a sense direction. The oscillators are mounted on a substrate. The three interconnected masses comprise a first, second and third mass in which the first mass is anchored to the substrate by a first flexure which allows movement substantially only in the drive direction, in which the second mass is coupled to the first mass by a second flexure that allows movement in the drive and the sense directions, and in which the third mass is coupled to the second mass by a third flexure which allows movement substantially only in the sense direction.

The first, and third flexures are folded micromachined springs having a resiliency substantially in only one direction. The second flexure is comprised of two coupled folded micromachined springs, each having a resiliency substantially in only one of two different directions.

The drive-mode oscillator and sense-mode oscillator each have two resonant peaks and a flat region between the peaks. The gyroscope is operated in the flat regions of the drive and sense-mode oscillators.

The drive-mode oscillator and sense-mode oscillator are arranged and configured to have matching drive and sense direction anti-resonance frequencies.

The second and the third masses combine to comprise a vibration absorber of the drive-mode oscillator, which vibration absorber mechanically amplifies the oscillations of the first mass.

The first mass is driven at a driving frequency, $\omega_{drive}$, by means of a input force $F_d$, which driving frequency, $\omega_{drive}$, is matched with the resonant frequency of an isolated passive mass-spring system comprised of the second and third masses and coupled flexures. The passive mass-spring system moves to cancel out the input force $F_d$ applied to the first mass, so that maximum dynamic amplification is achieved.

The third mass acts as the vibration absorber in the sense-mode oscillator to achieve large sense direction oscillation amplitudes due to mechanical amplification.

A sinusoidal Coriolis force is applied to the second mass, whose frequency is matched with a resonant frequency of the isolated passive mass-spring system of the third mass and its coupled flexures, so that the third mass achieves maximum dynamic amplification.

The frequency response of both the drive-mode oscillator and sense-mode oscillator have two resonant peaks and a flat region between the peaks. The drive-mode oscillator and sense-mode oscillator are both operated in the flat region of their response curves. The drive anti-resonance frequency, $\omega_{2x}$, of the second mass and sense anti-resonance frequency, $\omega_{3y}$, of the third mass are matched, namely $\omega_{3y}=\omega_{2x}$, or equivalently $(k_{3y}/m_3)^{1/2}=(k_{2x}/(m_2+m_3))^{1/2}$. This matching condition determines the optimal system parameters, together with the optimized ratios $\mu_x=(m_2+m_3)/m_1$, $y_x=\omega_{2x}/\omega_{1x}$, $\mu_y=m_3/m_2$, and $Y_y=\omega_{3y}/\omega_{2y}$, where $k_{3y}$ is the spring constant of the flexures coupled to the third mass, where $m_3$ is the magnitude of the third mass, $k_{2x}$ is the spring constant of the flexures coupled to the second mass, $m_2$ is the magnitude of the second mass, $m_3$ is the magnitude of the third mass, $\omega_{1x}$ is the drive anti-resonance frequency of the first mass, and $\omega_{2y}$ is the sense anti-resonance frequency of the second mass.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Figure 1:
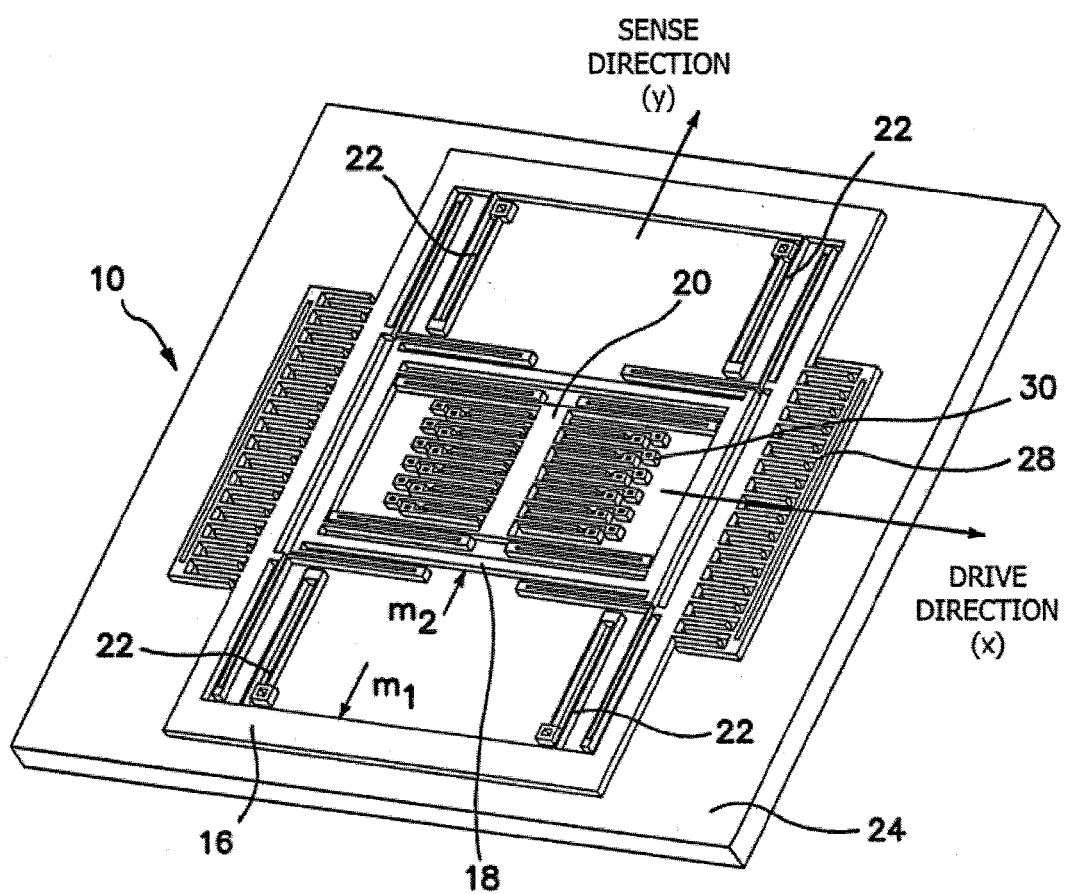
FIG. 1 is a conceptual schematic of the micromachined gyroscope with decoupled oscillation modes.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

First, we present a detailed analysis of the conventional gyroscope dynamics emphasizing the related challenges. Second, the design approach and the principle of operation are presented, together with a detailed comparison of the system characteristics to a conventional gyroscope. Third, the dynamics of the device is then analyzed, and fourth, a MEMS implementation of the design concept is presented along with an approach for determining optimal system parameters to maximize sensor performance.

Detailed Analysis Of The Conventional Gyroscope Dynamics

Almost all existing micromachined rate gyroscopes operate on the principle of rotation-induced Coriolis acceleration detection using a single vibrating proof mass suspended above the substrate. The proof mass is supported by anchored flexures, which serve as the flexible suspension between the proof mass and the substrate, making the mass free to oscillate in two orthogonal directions: the drive direction (-axis) and the sense direction (-axis). The overall dynamical system is simply a mass-spring-damper system, where the drive direction is excited by the sinusoidal electrostatic force, and the sense direction is excited by the rotation-induced Coriolis force. If the motion of a conventional single-mass gyroscope is decomposed into the two principle oscillation directions, the drive direction and the sense direction, the two equations of motion can be expressed as $$m\ddot{x} + c_x\dot{x} + (k_x - m(\Omega_y^2 + \Omega_z^2))x + m(\Omega_x\Omega_y - \Omega_z)y = F_d + 2m\Omega_z\dot{y}$$

$$m\ddot{y} - c_y\dot{y} + (k_y - m(\Omega_x^2 + \Omega_z^2))y + m(\Omega_x\Omega_y + \Omega_z)x - 2m\Omega_z\dot{x}$$

where m is the proof mass, $F_d$ is the drive direction excitation force, and $\Omega=(\Omega_x, \Omega_y, \Omega_z)$ is the input angular velocity vector. The two final terms $2m\Omega_z dy/dt$ and $2m\Omega_z dx/dt$ are the rotation-induced Coriolis forces, causing dynamic coupling between the oscillation axes proportional to the angular rate input. In most of the reported micromachined vibratory rate gyroscopes, the proof mass m is driven at or near the resonance frequency in the drive direction by an external sinusoidal force, which are generally the electrostatic forces applied by comb-drive structures. When the gyroscope is subjected to an angular rotation, the Coriolis force with the same frequency as the driving signal is induced in the y-direction. If the drive and sense resonant frequencies are matched, the Coriolis force excites the system into resonance in the sense direction, as well. The resulting oscillation amplitude in the sense direction is proportional to the Coriolis force and, thus, to the angular velocity to be measured.

The dynamics of the single-mass gyroscope is understood more clearly starting with the assumption that the system is driven without feedback control in drive direction with a constant amplitude drive force $F_d$ at the drive frequency $\omega_d$, namely $F_d=F_0 \sin \omega_d t$. The dynamical system will have two independent resonant frequencies: sense direction resonant frequency $\omega_y=(k_y/m)^{1/2}$ and drive direction resonant frequency $\omega_x=(k_x/m)^{1/2}$.

The rotation-induced Coriolis force $F_c=2m\omega_z dx/dt$, which is proportional to drive direction oscillation amplitude, is the only driving force in the sense direction for an ideal gyroscope. Sense direction amplitude is proportional to the Coriolis force and, thus, to drive direction oscillation amplitude. If the proof mass m is driven into resonance in drive direction, i.e., $\omega_d=\omega_x$, a high sense direction amplitude is expected due to the increased Coriolis force resulting from large drive direction amplitudes achieved by resonance. If the system is driven at the sense direction resonant frequency, i.e., $\omega_d=\omega_y$, then the sense direction amplitude is amplified by the quality factor due to resonance. Thus, when the resonance frequencies are mismatched $\omega_d\neq\omega_x$, the frequency response of the system has two resonant peaks, one at $\omega_x$ and another at $\omega_y$. When the resonant frequencies are tuned to match exactly, i.e., $\omega_x=\omega_y$, the frequency response of the system has one combined resonant peak, which will provide a much larger response amplitude, leading to the highest sensitivity possible. However, the mode-matching requirement renders the system response very sensitive to variations in system parameters due to fabrication imperfections and fluctuations in operating conditions, which shift the drive or sense resonant frequencies. Inevitable fabrication imperfections affect both the geometry and the material properties of MEMS devices. The designed stiffness values deviate drastically due to etching processes, deposition conditions, or residual stresses. Variations in the temperature of the structure can also perturb the dynamical system parameters due to the temperature dependence of Young's Modulus and thermally induced localized stresses.

Various symmetric gyroscope designs have been reported based on enhancing performance by mode-matching and allowing to minimize temperature dependence. However, mode-matching requirements cannot be met without feedback control, even with the symmetric designs under the presence of the mentioned perturbations. For the devices packaged in high vacuum to enhance the sensitivity, the bandwidth of the resonance peaks is extremely narrow, leading to much tighter mode-matching requirements. Also the gain is affected significantly by fluctuations in damping conditions, which makes the device very vulnerable to any possible vacuum leak in the package. Furthermore, as the modes are matched closer, the mechanical interference between the modes becomes more significant, resulting in operation instability and drift. In order to suppress coupled oscillation and drift, various devices have been reported employing independent suspension beams for the drive and sense modes.

The gyroscope design concept illustrated in this specification eliminates the limitations due to mode-matching requirement, damping sensitivity and coupled oscillation challenges by utilizing mechanically decoupled nonresonant drive and sense oscillators incorporating three proof masses. MEMS gyroscopes comprised of two interconnected proof masses have been reported to achieve improved robustness; however, the drive and sense oscillators cannot be mechanically decoupled, and the dynamical response characteristics of the oscillators can't be set independently in these approaches.

Gyroscope Structure And Principle Of Operation

In the illustrated embodiment, a micromachined gyroscope system 10 is disclosed that utilizes dynamical amplification in the decoupled drive oscillators 12 and sense oscillators 14 in order to achieve large oscillation amplitudes without resonance. The overall dynamical system 10, namely 2-DOF in drive and 2-DOF in sense directions, is comprised of three interconnected proof masses 16, 18 and 20 as shown in FIG. 1.

The first mass 16 or $m_1$, which is the only mass 16 excited in the drive direction, which is here the x direction in FIG. 1, is constrained in the sense direction, which is the y direction in FIG. 1, and is free to oscillate only in the drive direction. The second mass 18 or $m_2$ and third mass 20 or $m_3$ are constrained with respect to each other in the x drive direction, thus oscillating as one combined mass in the x drive direction. However, masses 18 and 20 are free to oscillate independently in the y sense direction, forming the sense-direction oscillator. The first mass 16 and the combination of the second and third masses 18 and 20 form the drive-direction oscillator 12, where mass 16 is the driven mass as diagrammatically depicted in FIG. 2.

In order to minimize instability due to dynamical coupling between the drive and sense modes, the drive and sense-mode oscillators 12 and 14 are mechanically decoupled. The driven mass 16 oscillates only in the x drive direction, and possible anisoelasticities due to fabrication imperfections are suppressed by the suspension 22 fixed in the y sense direction, best shown in FIG. 4. The second mass 18 oscillates in both x drive and y sense directions, and generates the rotation-induced Coriolis force that excites the sense-direction oscillator 14. The sense direction response of the third mass 20, which comprises the vibration absorber of the sense-mode oscillator 14, is detected for measuring the input angular rate. Since the springs 24 shown in FIG. 2 that couple the sense mass 20 to mass 18 deform only for relative y sense direction oscillations, instability due to mechanical coupling of drive and sense directions is minimized, significantly enhancing gyroscopic performance due to reduced drift.

Coriolis Response

Figure 3A:
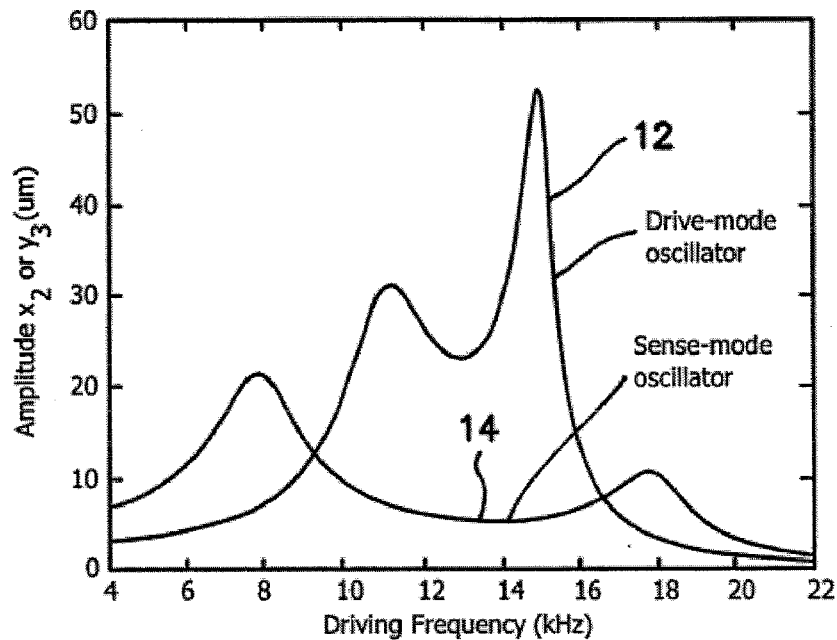
FIG. 3(a) is a graph of the $x_2$ and $y_3$ amplitudes as a function of driving frequency of the drive and sense-mode oscillators, with the overlapped flat regions.
Figure 3B:
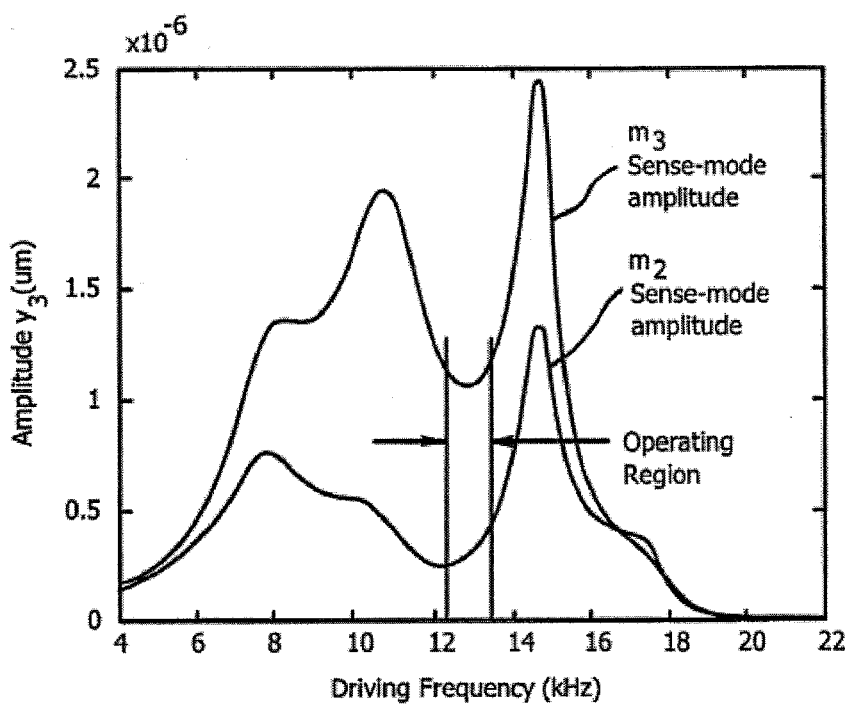
FIG. 3(b) is a graph of the $y_3$ amplitudes as a function of driving frequency of the overall gyroscope system. The oscillation amplitude is relatively insensitive to parameter variations and damping fluctuations in the flat operating region in both FIGS. 3(a) and 3(b).

The frequency responses of the drive-mode oscillator 12 and the sense-mode oscillator 14 have two resonant peaks and a flat region between the peaks. The device 10 is nominally operated in the flat regions of the drive and sense-mode oscillators 12 and 14, where the response amplitudes of the oscillators 12 and 14 are less sensitive to parameter variations. In order to operate both of the drive and sense-mode oscillators 12 and 14 in their flat-region frequency bands, the flat regions of the oscillators 12 and 14 have to be designed to overlap as depicted in the graph of FIG. 3(*a*) by matching the drive and sense direction anti-resonance frequencies, as will be explained in below. However, in contrast to the conventional gyroscopes, the flat regions with significantly wider bandwidths can be overlapped without feedback control with sufficient precision in spite of fabrication imperfections and operation condition variations.

The response of the combined dynamical system to the rotation-induced Coriolis force will have a flat region in the frequency band coinciding to the flat regions of the independent drive and sense-mode oscillators as depicted in the graph of FIG. 3(*b*). When the device is operated in this flat region, the oscillation amplitudes in both drive and sense directions are relatively insensitive to variations in system parameters and damping. Thus, by utilizing dynamical amplification in the oscillators instead of resonance, increased bandwidth and reduced sensitivity to structural and thermal parameter fluctuations and damping changes are achieved. Consequently, the design concept resulting in improved robustness and long-term stability over the operating time of the device is expected to relax control requirements and tight fabrication and packaging tolerances.

B. Comparison of Response Characteristics With a Conventional Gyroscope

The proposed design approach allows the widening of the operation frequency range of the gyroscope to achieve improved robustness, while sacrificing the response amplitude in the y sense direction. The following numerical example demonstrates the trade-off between bandwidth of the gyroscope and the amplitude of response. For a clear comparison, we consider a conventional 2-DOF gyroscope with the same mass, stiffness and damping parameters as the isolated passive mass-spring system of the system, which is designed with matched resonance frequencies at 10.3 kHz in the drive and sense directions. It is assumed that both gyroscopes are vacuum packaged so that the pressure within the encapsulated cavity is equal to 100 miliTorrs (13.3 Pa), and are both excited to achieve 5 μm drive-direction oscillation amplitudes. Under these conditions, for 1 °/s input angular rate, the conventional 2-DOF gyroscope will have a $2.8 \times 10^{-3}$ μm response amplitude in the sense direction, while the sense mass of the gyroscope will have an amplitude of response equal to $0.72 \times 10^{-3}$ μm. However, in the case of the conventional 2-DOF gyroscope, the extremely narrow bandwidth of the response (about 1.1 Hz) significantly limits the robustness of the device. In a 2-DOF system, a frequency mismatch of 0.1% between drive and sense directions causes drop of the sense-direction amplitude down to $1.15 \times 10^{-3}$ μm (59% gain drop), and 1% frequency mismatch results in $0.14 \times 10^{-3}$ μm oscillation amplitude (94% gain drop). In contrast, the gyroscope demonstrates significantly improved robustness against system parameter variations; 1% deviation in passive mass resonance frequency results in $0.70 \times 10^{-3}$ μm amplitude (3% change in the gain). It should be also noted that, if the pressure is increased inside the package by 10%, it will lead to a 14% drop in gain of the conventional gyroscope, while the gain of the gyroscope will change by less than 0.1%.

Moreover, since the design space of the gyroscope is larger than of the conventional gyroscope, the design concept allows maximum flexibility in optimizing the system response. The optimal compromise between amplitude of the response and bandwidth can be obtained by selecting parameters of the system (ratio of masses and spring constants). For example, the gain of the system can be improved by trading-off bandwidth; if the coupling spring constant between the passive and active masses of the 4 DOF gyroscope is increased from 4.2 N/m to 4.8 N/m, the amplitude of the response in the sense direction will increase from $0.72 \times 10^{-3}$ μm to $1.2 \times 10^{-3}$ μm, while the response bandwidth will decrease from 23 Hz to 12 Hz, which is still over an order of magnitude larger than the bandwidth of the conventional gyroscope discussed above. Thus, the design concept provides more freedom in defining trade-offs between gain of the response (for higher sensitivity) and the system bandwidth (for increased robustness). Selection of the parameter set is typically guided by application requirements.

Dynamics Of The Gyroscope

The dynamics of the idealized model for the gyroscope system 10 is best understood in the noninertial coordinate frame associated with the gyroscope. As previously stated, the system 10 is comprised of three interconnected proof masses 16, 18, and 20 where each mass can be assumed to be a rigid body with a position vector attached to a rotating reference frame, resulting in an absolute acceleration in the inertial frame A $$\vec{a}_A = \vec{a}_B + \dot{\vec{\Omega}} \times \vec{r}_B + \vec{\Omega} \times (\vec{\Omega} \times \vec{r}_B) + 2\vec{\Omega} \times \vec{v}_B$$

where the subscript A denotes "relative to inertial frame A," where B denotes "relative to rotating gyroscope frame B," where v and a are the velocity and acceleration vectors with respect to the designated reference frame respectively, and where Ω is the angular velocity vector of the gyroscope frame B relative to the inertial frame A. The term, $2\Omega \times v_B$, is the Coriolis acceleration, which excites the system 10 in the y sense direction. Thus, when a mass 16, 18 or 20 is oscillating in the drive direction (x-axis) is subject to an angular rotation rate of $\Omega_z$ about the z-axis, the Coriolis acceleration induced in the sense direction (y-axis) is $a_y = 2\Omega_z \, dx/dt$.

Similarly, the equations of motion for the three proof masses observed in the noninertial rotating frame can be expressed in the inertial frame as $$m_1\vec{a}_1 = \vec{F}_1 + \vec{F}_d - 2m_1\vec{\Omega}x\vec{v}_1 m_1\vec{\Omega}x(\vec{\Omega}x\vec{r}_1) - m_1\dot{\vec{\Omega}}x\vec{r}_1$$

$$m_2\vec{a}_2 = \vec{F}_2 - 2m_2\vec{\Omega}x\vec{v}_2 - m_2\vec{\Omega}x(\vec{\Omega}x\vec{r}_2) - m_2\dot{\vec{\Omega}}x\vec{r}_2$$

$$m_3\vec{a}_3 = \vec{F}_3 - 2m_3\vec{\Omega}x\vec{v}_3 - m_3\vec{\Omega}x(\vec{\Omega}x\vec{r}_3) - m_3\dot{\vec{\Omega}}x\vec{r}_3$$

where $F_1$ is the net external vector force applied to mass 16, $m_1$, including elastic and damping forces from the substrate and elastic interaction force from mass 18, $m_2$; $F_2$ is the net external vector force applied to mass 18, $m_2$, including the damping force from the substrate and elastic interaction force from and masses 16 and 20; $F_3$ is the net external vector force applied to mass 20, $m_3$, including the damping force from the substrate and the elastic interaction force from mass 18, and is the driving force applied to mass 16. In the gyroscope frame, $r_1$, $r_2$, and $r_3$ are the position vectors, and $v_1$, $V_2$, and $V_3$ are the velocity vectors of masses 16, 18 and 20 respectively. Since the first mass 16 is fixed in the y sense direction [i.e., $y_1(t)=0$ and masses 18 and 20 move together in the x drive direction i.e., $x_2(t)=x_3(t)$], the 4-DOF equations of motion (along the x-axis and y-axis) of the three mass subsystems subjected to an angular rate of $\Omega_z$ about the axis normal to the plane of motion (z-axis) become $$m_1\ddot{x}_1 + c_{1x}\dot{x}_1 + k_{1x}x_1 = k_{2x}(x_2 - x_1) + m_1\Omega_z^2 x_1 + F_d(t)$$

$$(m_2 + m_3)\ddot{x}_2 + (c_{2x} + c_{3x})\dot{x}_2 + k_{2x}(x_2 - x_1) =$$
$$(m_2 + m_3)\Omega_z^2 x_2 + 2m_2\Omega_z\dot{y}_2 + 2m_3\Omega_z\dot{y}_3 + m_2\dot{\Omega}_z y_2 + m_3\dot{\Omega}_z y_3$$

$$m_2\ddot{y}_2 + c_{2y}\dot{y}_2 + k_{2y}y_2 = k_{3y}(y_3 - y_2) + m_2\Omega_z^2 y_2 - 2m_2\Omega_z\dot{x}_2 - m_2\dot{\Omega}_z x_2$$

$$m_3\ddot{y}_3 + c_{3y3} + k_{3y}(y_3 + y_2) = m_3\Omega_z^2 y_3 - 2m_3\Omega_z\dot{x}_3 - m_3\dot{\Omega}_z x_3$$

where Fd(t) is the driving electrostatic force applied to the active mass at the driving frequency $\omega_d$, and $\Omega_z$ is the angular velocity applied to the gyroscope about the z-axis. It should be noted that the terms $2m_2\Omega_z dx_2/dt$ and $2m_3\Omega_z dx_3/dt$ are the Coriolis forces that excite the system in the y sense direction, and the Coriolis response of mass 20 in the $y_3$ sense-direction is detected for angular rate measurement.

Mems Implementation of the Design Concept

The MEMS implementation of the conceptual design presented above is now described. First, the suspension subsystem design for the system 10 is investigated with the derivation of the stiffness values, then the damping components of the dynamic system derived above are analyzed. Finally, the issue of achieving dynamic amplification in the drive and sense modes is addressed, along with an approach for determining optimal system parameters to maximize sensor performance.

Suspension Design

Figure 4:
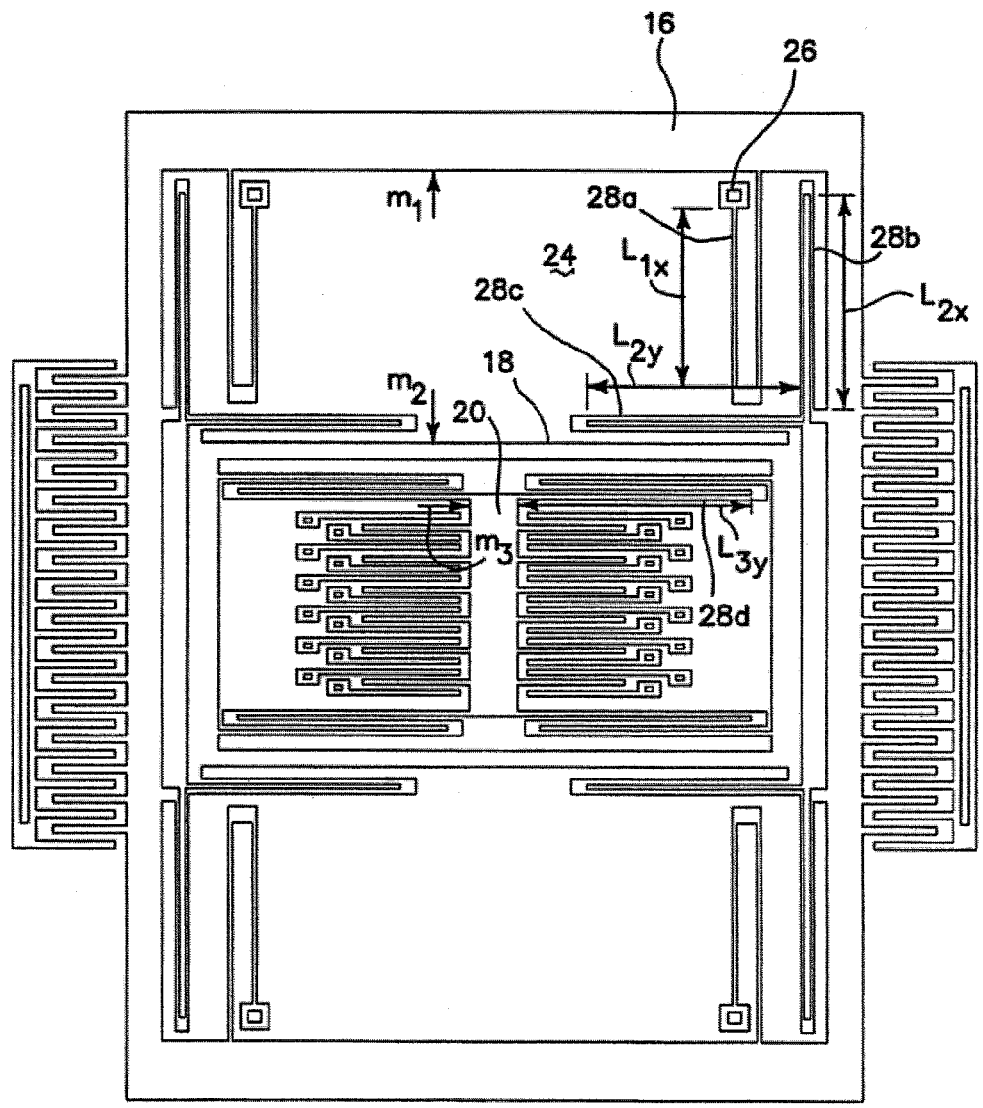
FIG. 4 is an enlargement of a portion of the suspension system configuration that forms the mechanically decoupled drive and sense-mode oscillators with the three proof masses.

The complete suspension subsystem of the device is designed such that the first mass 16 with 1-DOF is fixed in the y sense direction, and is free to oscillate only in the x drive direction, the second mass 18 has 2-DOF, oscillating in both x drive and y sense directions, and the third mass 20 with 1-DOF is fixed with respect to in the x drive direction, and free to oscillate independently in the y sense direction as best shown in the diagrammatic enlargement of FIG. 4.

The suspension 22 that connects to the substrate 24 via anchors 26 is comprised of four double-folded flexures 28a, 28b, 28c, and 28d, where each beam of length $L_{1x}$ in the folded flexures 28a, 28b, 28c, and 28d can be modeled as a fixed guided beam deforming in the orthogonal direction to the axis of the beam, leading to an overall stiffness of $$k_{1x} = \frac{4}{2}\left(\frac{1}{2}\frac{3EI}{\frac{L_{1x}^3}{2}}\right) = \frac{2Etw^3}{L_{1x}^3}$$

where E is the Young's Modulus, I is the second moment of inertia of the beam cross-section, t is the beam thickness, and w is the beam width. Possible anisoelasticities due to fabrication imperfections are suppressed having the driven mass 16 oscillating purely along the geometrical x drive axis by this suspension 22, including flexures 28a and 28b, constraining in the y sense direction. Effects of residual stresses are also decreased by employing folded springs as flexures 28a, 28b, 28c, and 28d allowing stress-relief.

The second mass 18 is connected to mass 16 by four flexure beams comprised of two double-folded flexures 28b and 28c of length $L_{2x}$ and $L_{2y}$ that deform independently in the x drive and y sense directions. These beams can also be modeled similarly, resulting in $m_2$ drive and sense direction stiffness values of $$k_{2x} = \frac{2Etw^3}{L_{2x}^3}, \quad k_{2y} = \frac{2Etw^3}{L_{2y}^3}$$

In the calculation of the spring rates in the x drive or y sense direction, the effect of axial strain in the other beams is neglected. The assumption is reasonable in this analysis, since the axial stiffness of a beam, $k_{axial}$=Etw/L, is generally four orders of magnitude ($L^2/w^2$ times) larger than the fixed-guided stiffness, which means the beams under axial load can be assumed infinitely stiff.

The suspension 22 connecting the third mass 20 to is made up of four three-folded flexures 28b, 28c and 28d for this specific design, fixing mass 20 with respect to mass 18 in the x drive-direction. Since these flexures 28b, 28c and 28d are stiff in the x drive-direction and deform only in the y sense direction, instability due to dynamical coupling between the drive and sense modes in the sensing element is eliminated, minimizing zero-rate drift of the gyroscope. With a length of $L_{3y}$ for each beam, the overall stiffness is $$k_{3y} = \frac{4}{3}\frac{Etw^3}{L_{3y}^3}$$

The lengths $L_{1x}$, $L_{2x}$, $L_{2y}$ and $L_{3y}$ are designed according to the optimized stiffness values derived below. Through this suspension design, mechanically decoupled x drive and y sense-mode oscillators are formed with the three proof masses 16, 18 and 20, while instability due to mechanical coupling of x drive and y sense directions is minimized, leading to significantly reduced zero-rate drift.

B. Damping Estimation

Figure 2:
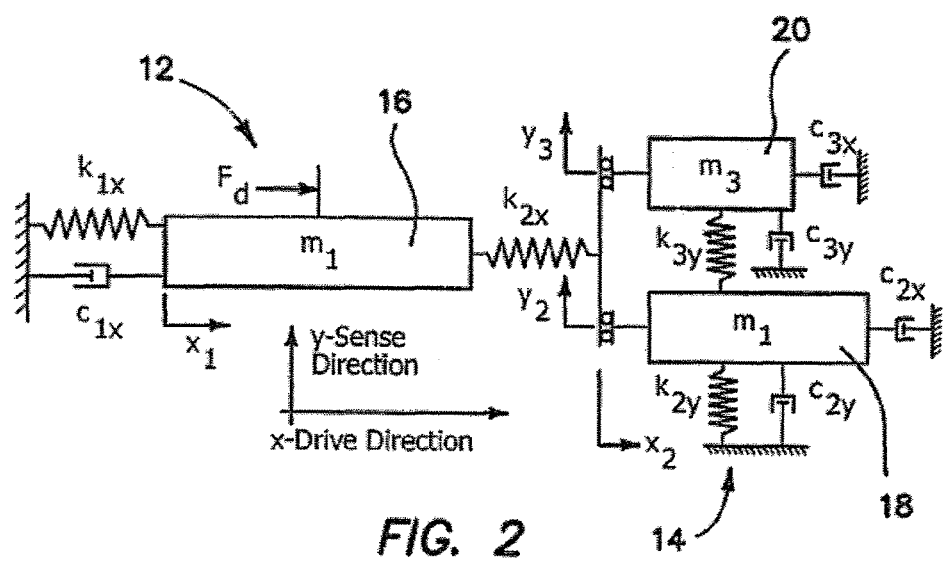
FIG. 2 is a diagram of a lumped mass-spring-damper model of the overall gyroscope dynamical system.

The dominant mechanism of energy dissipation in the gyroscope structure is the internal friction of the fluid confined between the proof mass surfaces and the stationary surfaces. The damping coefficients $c_{1x}$, $c_{2x}$, $c_{3x}$, and $c_{3y}$ in the gyroscope dynamical system shown in FIG. 2 are due to the viscous effects of the air between the masses 16, 18 and 20 and the substrate 24, and in between the comb-drive 28 and sense capacitor fingers 30 as shown in FIG. 1.

For the driven mass 16, the total damping in the drive mode can be approximated as the combination of the slide film damping between the mass 16 and the substrate 24, and the slide film damping between the integrated comb fingers 30. Assuming an instantaneously developed linear fluidic velocity profile, slide film damping can be modeled as a Couette flow, leading to $$c_{1x} = \mu_{eff} \frac{A_1}{z_0} + \mu_{eff} \frac{2N_{comb} l_{comb} t}{y_{comb}}$$

where $A_1$ is the area of the active mass, $z_0$ is the elevation of the proof mass from the substrate, t is the thickness of the structure, $N_{comb}$ is the number of comb-drive fingers, $y_{comb}$ is the distance between the fingers, and $l_{comb}$ is the overlapping length of the fingers. The effective viscosity is $\mu_e = \mu_p p$, where p is the ambient pressure within the cavity of the packaged device, and $\mu_p = 3.7 \times 10^{-6}$ kg/m$^2$.s.torr ($2.78 \times 10^{-6}$ [(kg/m$^2$.s.Pa)] is the viscosity constant for air.

Since there are no actuation and sensing capacitors attached to the second mass 18, the damping coefficients in the x drive and y sense directions are equal, and are only due to the Couette flow between the proof mass 18 and the substrate 24.

$$c_{2x} = c_{2y} = \mu_{eff} \frac{A_2}{z_0}$$

Thus, the approach results in reduced energy dissipation on mass 18, and also symmetric damping in the drive and sense directions. For the third mass 20, the total damping in the drive mode results from Couette flow between the mass 20 and the substrate 24, as well as Couette flow between the air-gap capacitor fingers 28

$$c_{3x} = \mu_{eff} \frac{A_3}{z_0} + \mu_{eff} \frac{2N_{cap} l_{cap} t}{y_{cap}}$$

where $A_3$ is the area of the passive mass, $N_{cap}$ is the number of air-gap capacitors, $y_{cap}$ is the distance between the capacitor fingers 30, and $l_{cap}$ is the overlapping length of the fingers 30. Damping on mass 20 in the sense mode can be estimated as the combination of Couette flow between the proof mass 20 and the substrate 24, and the squeeze-film damping between the air-gap capacitor fingers 30:

$$c_{3y} = \mu_{eff} \frac{A_3}{z_0} + \mu_{eff} \frac{7N_{cap} l_{cap} t^3}{y_{cap}^3}$$

It should be emphasized that the design approach suggests the sensing mass 20 to have minimal mass in contrast to the conventional gyroscopes. This allows minimizing the overall energy dissipation on the sensing mass 20 due to the reduced footstep area of the mass 20. More accurate slide-film damping models can be generated considering the gas-rarefaction effects at low pressures and narrow gaps, kinetic gas models, or plate motions that propagate into the fluid with rapidly diminishing steady-state amplitude. Including the nonlinear effects of squeeze-film damping together with computational fluid dynamics simulations will also improve the accuracy of the damping model.

C. Parameter Optimization for Dynamic Amplification

Since the foremost mechanical factor determining the performance of the gyroscope is the sense direction deflection of the sensing element, mass 20, due to the input rotation, the parameters of the dynamical system should be optimized to maximize the oscillation amplitude of mass 20 in the y sense direction.

However, the optimal compromise between amplitude of the response and bandwidth should be obtained to maintain robustness against parameters variations, while the response amplitude is sufficient for required sensitivity. The trade-offs between gain of the response (for higher sensitivity) and the system bandwidth (for increased robustness) will typically be guided by application requirements.

Figure 5A:
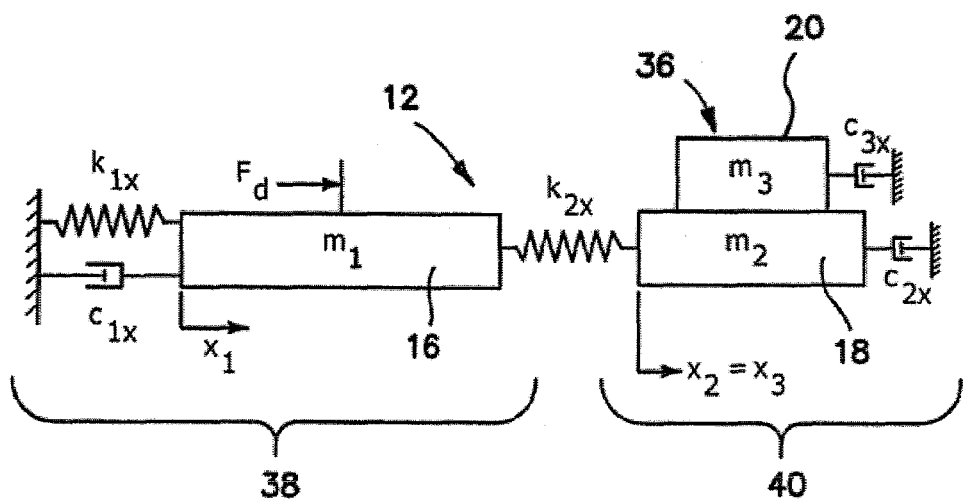
FIG. 5(a) is a diagram of a lumped mass-spring-damper model for the drive-mode oscillator of the gyroscope.

For the purpose of optimizing each parameter in the dynamical system, the overall gyroscope system 10 can be decomposed into the drive-mode oscillator 12 diagrammatically depicted in FIG. 5(a) and the sense-mode oscillator 14 diagrammatically depicted in FIG. 5(b), analyzed separately below.

Drive Mode Parameters:

The first mass 16 (which is free to oscillate only in the x drive direction, and is fixed in the y sense direction) and the combination of the second and third masses 18 and 20 (which are fixed with respect to each other in the x drive direction) form the drive-direction oscillator 12, where mass 16 is driven by the electrostatic forces. The main objective of parameter optimization in the drive mode is to maximize the rotation-induced Coriolis force generated by the second mass 18. This force $F_{c2} = 2m_2\Omega_z dx/dt$ is the dominant force exciting the sense-direction oscillator 14, and is proportional to the sensor sensitivity.

In the drive mode, the gyroscope 10 is simply a 2-DOF system. The sinusoidal drive force is applied to the first mass 16 (active mass) by the comb drive structures 28. The combination of the second and third masses 18 and 20 comprise the vibration absorber 36 (passive mass) of the oscillator 12, which mechanically amplifies the oscillations of mass 16. Approximating the gyroscope 10 by a lumped mass-spring-damper model as shown in FIG. 5(a), the equations of motion in the drive direction can be expressed as $$m_1 \ddot{x}_1 + c_{1x}\dot{x}_1 + k_{1x}x_1 k_{2x}(x_2 - x_1) + F_d (m_2 + m_3)\ddot{x}_2 = c_{2x}$$
$$\ddot{x}_2 + k_{2x}x_2 = k_{2x}x_1.$$

Figure 6A:
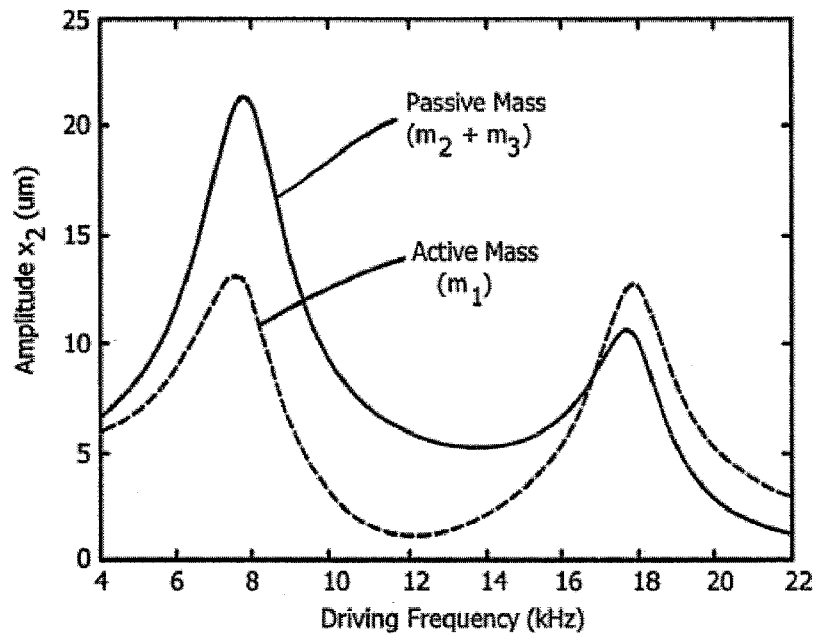
FIG. 6(a) is a graph of the $x_2$ amplitudes as a function of driving frequency of the drive-mode oscillator.

When a constant-amplitude sinusoidal force $F_c = F_0 \sin(\omega t)$ is applied on the active mass 16 by the interdigitated comb-drives 28, the steady-state response of the system 12 as illustrated by graph FIG. 6(a) will be as seen in the equation, $$X_1 = \frac{F_0}{k_{1x}} \times \frac{1 - \left(\frac{w}{w_{2x}}\right)^2 + jw\frac{c_{2x}}{k_{2x}}}{\left[1 + \frac{k_{2x}}{k_{1x}} - \left(\frac{w}{w_{1x}}\right)^2 + jw\frac{c_{1x}}{k_{1x}}\right]\left[1 - \left(\frac{w}{w_{2x}}\right)^2 + jw\frac{c_{2x}}{k_{2x}}\right] - \frac{k_{2x}}{k_{1x}}}$$

$$X_2 = \frac{F_0}{k_1} \frac{1}{\left[1 + \frac{k_{2x}}{k_{1x}} - \left(\frac{w}{w_{1x}}\right)^2 + jw\frac{c_{1x}}{k_{1x}}\right]\left[1 - \left(\frac{w}{w_{2x}}\right)^2 + jw\frac{c_{2x}}{k_{2x}}\right] - \frac{k_{2x}}{k_{1x}}}$$

where $\omega_{1x}=(k_{1x}/m_1)^{1/2}$ and $\omega_{2x}=(k_{2x}/[m_2+m_3])^{1/2}$ are the resonant frequencies of the isolated active mass-spring system 38 and passive mass-spring system 40, respectively. When the driving frequency $\omega_{drive}$ is matched with the resonant frequency of the isolated passive mass-spring system 40, i.e., $\omega_{drive}=(k_{2x}/[m_2+m_3])^{1/2}$, the passive mass 18 and 20 moves to exactly cancel out the input force $F_d$ applied on the active mass, and maximum dynamic amplification is achieved.

Figure 7A:
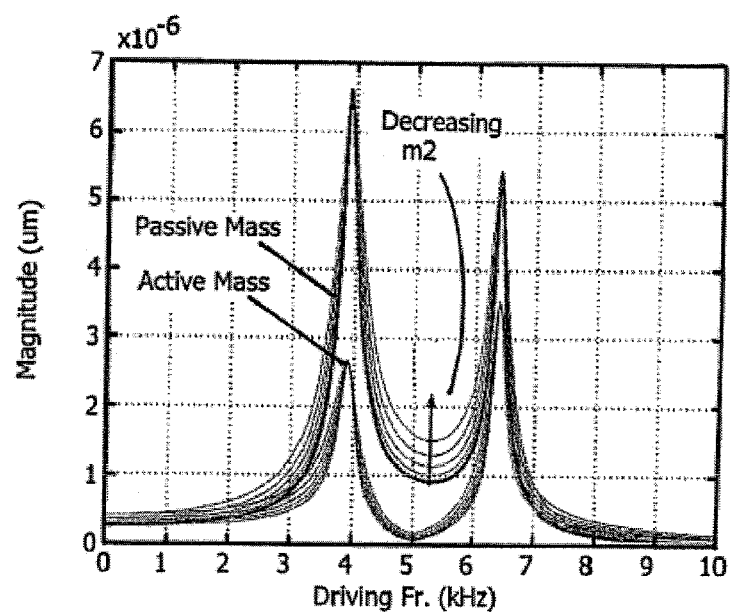
FIG. 7(a) is a graph of the $x_2$ amplitudes as a function of driving frequency for the dual mass oscillator showing the effect of variations in the passive mass $(m_2+m_3)$.
Figure 7B:
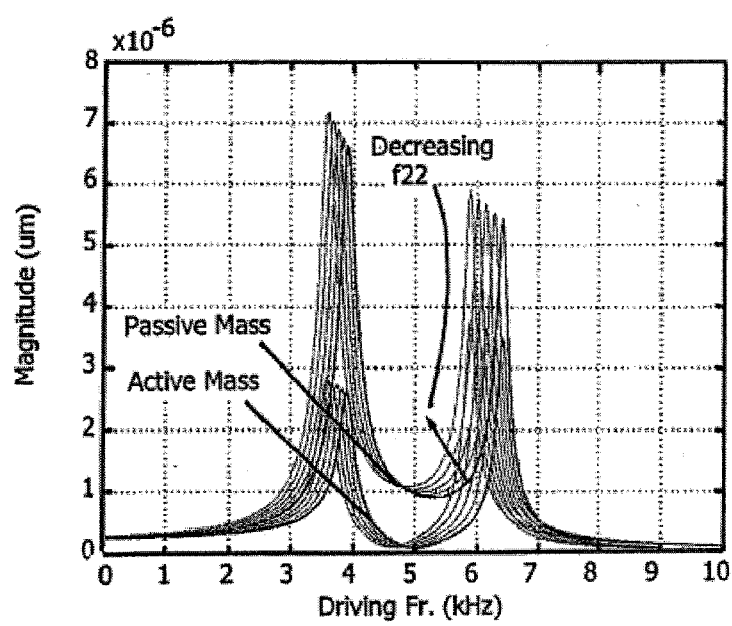
FIG. 7(b) is a graph of the $x_2$ amplitudes as a function of driving frequency for the dual mass oscillator showing the effect of variations in antiresonant frequency $\omega_{2x}$ on drive direction response.

Maximizing the Coriolis Force $F_{c2}=2m_2\Omega_z dx_2/dt$ generated by mass 18 requires a large proof mass 18, and large drive direction amplitude $x_2$. However, if the response of the passive mass 18 and 20 in the x drive direction is observed for different $m_2$ values with $m_1$ being fixed, it is seen that for high oscillation amplitudes of passive mass 18 and 20, mass 18 and 20 should be minimized as illustrated in the graph of FIG. 7(a). The anti-resonant frequency $\omega_{2x}$ of the isolated passive mass spring system 38 is determined according to gyroscope operating frequency specifications, noting that larger Coriolis forces are induced at higher frequencies, but the oscillation amplitudes become larger at lower frequencies as illustrated in the graph of FIG. 7(b). Once $\omega_{2x}$ is fixed, the drive direction spring constant $k_{2x}$ is obtained from $\omega_{2x}$ and masses 18 and 20.

Figure 8A:
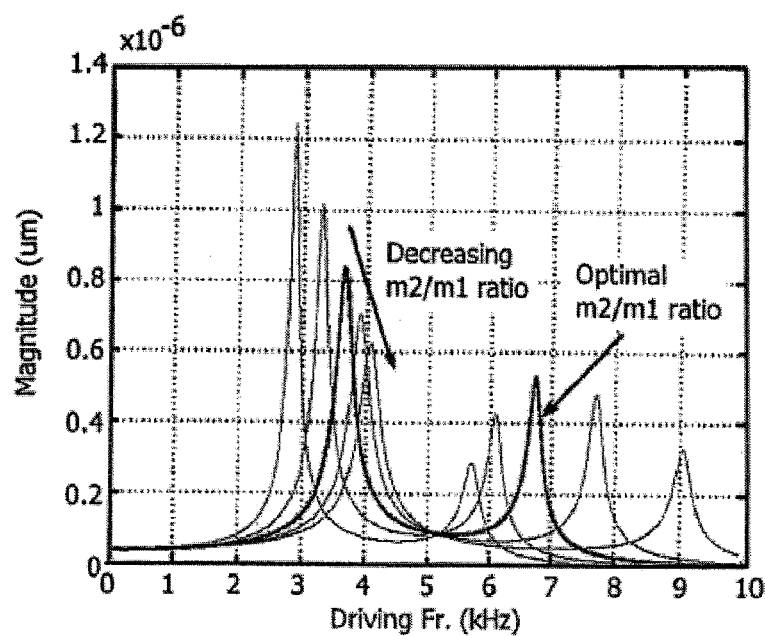
FIG. 8(a) is a graph of the $x_2$ amplitudes as a function of driving frequency for the dual mass oscillator showing the effect of variations in mass ratio $\mu_x=(m_2+m_3/m_1$.

The optimal drive direction mass ratio $\mu_x=(m_2+m_3)/m_1$ determining the mass of the active mass 16 is dictated by low sensitivity to damping, response bandwidth and oscillation amplitude. In order to achieve insensitivity to damping, the resonance peaks of the 2-DOF system response have to be separated far enough, which imposes a minimum value of $\mu_x$. For a wide bandwidth, a large $\mu_x$ is required for large enough separation of the peaks; however, to prevent gain drop, the peak separation should be minimized as illustrated in the graph of FIG. 8(a).

Figure 8B:
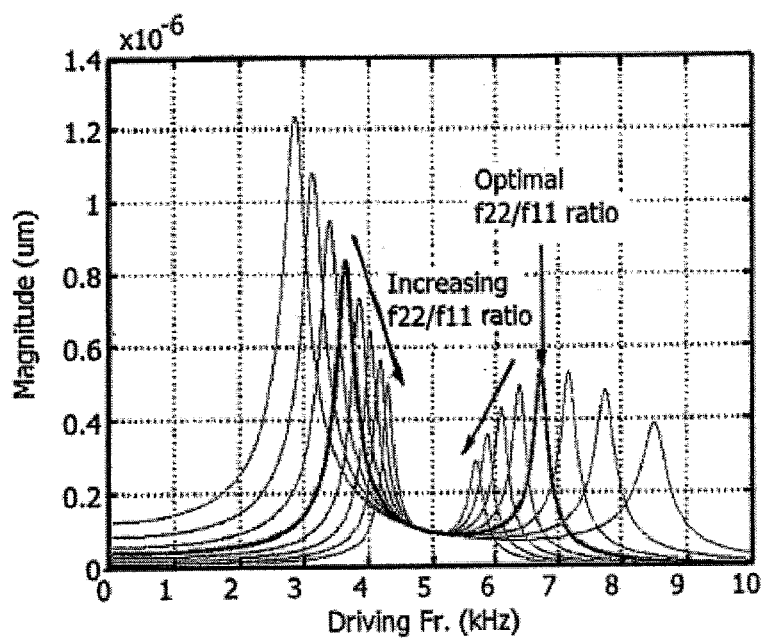
FIG. 8(b) is a graph of the $x_2$ amplitudes as a function of driving frequency for the dual mass oscillator showing the effect of variations in frequency ratio $y_x=\omega_{2x}/\omega_{1x}$ on drive direction response.
Figure 9:
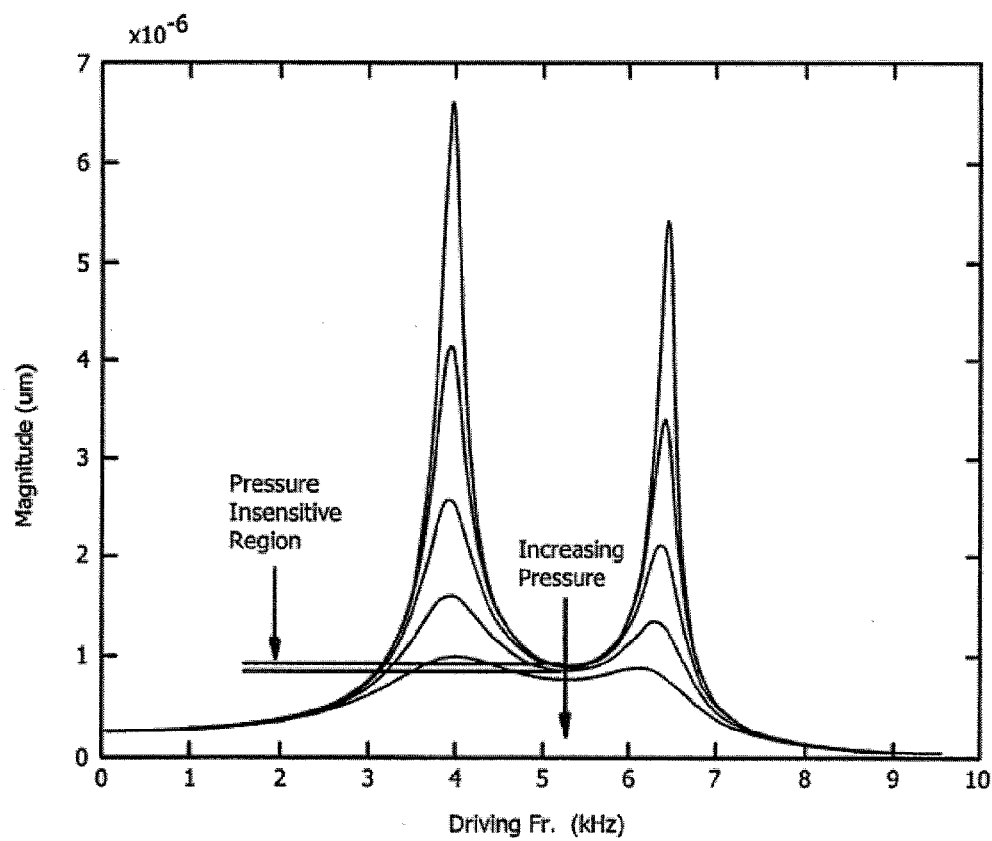
FIG. 9 is a graph of the $x_2$ amplitudes as a function of driving frequency for the dual mass oscillator showing the effect of variations in damping on drive direction response. When the damping is under a critical value, the response in the flat region is insensitive to pressure changes.

The degree of mechanical amplification depends on the ratio of the resonance frequencies of the isolated active system 38 and passive mass-spring system 40, namely $y_x=\omega_{2x}/\omega_{1x}=(k_{2x}m_1/k_{1x}(m_2+m_3))^{1/2}$. The optimal frequency ratio $y_x$ has to be determined such that $y_x$ is high enough for high mechanical amplification, and high oscillation amplitudes of passive mass as illustrated in the graph of FIG. 8(b). From the optimal values of $\mu_x$ and $\omega_{1x}$, the drive direction spring constant $k_{1x}$ of the active mass 16 is obtained. Finally, the damping conditions of the overall device have to be checked to verify that damping values are in the region where the response gain in the antiresonance region is insensitive to damping variations as illustrated by the graph of FIG. 9.

Figure 5B:
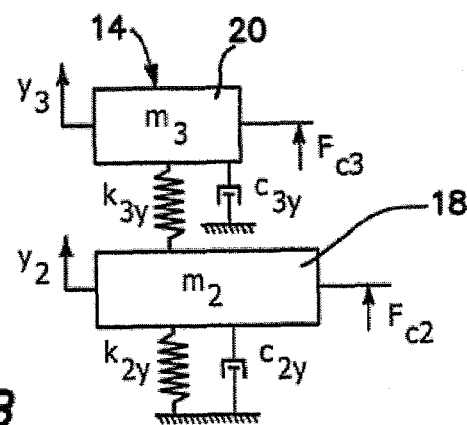
FIG. 5(b) is a diagram of a lumped mass-spring-damper model for the sense-mode oscillator.

2) Sense Mode Parameters:

The sense-direction oscillator 14 in FIG. 5b is formed by masses 18 and 20, where mass 20 acts as the vibration absorber to achieve large sense direction oscillation amplitudes due to mechanical amplification. The objective of parameter optimization in the sense mode is to maximize $y_3$, which is the sense direction oscillation amplitude of the sensing element 20.

The system is driven by the rotation-induced Coriolis forces $F_{c2}=2m_2\Omega_z dx_2/dt$ and $F_{c3}=2m_3\Omega_z dx_2/dt$ generated by mass 18 and 20 respectively. The dominant force exciting the sense direction oscillator is $F_{c2}$, since the mass of the active mass 18 is significantly larger than the mass of the passive mass 20. The equations of motion of the lumped mass-spring-damper model of the sense-mode oscillator become $$m_2\ddot{y}_2+c_{2y}\dot{y}_2+k_{2y}y_2=k_{3y}(y_3-y_2)+2m_2\Omega_z\dot{x}_2 m_3\ddot{y}_3+c_{3y}\dot{y}_3+k_{3y}y_3=k_{3y}y_2+2m_3\Omega_z\dot{x}_2. \quad (3)$$

Figure 6B:
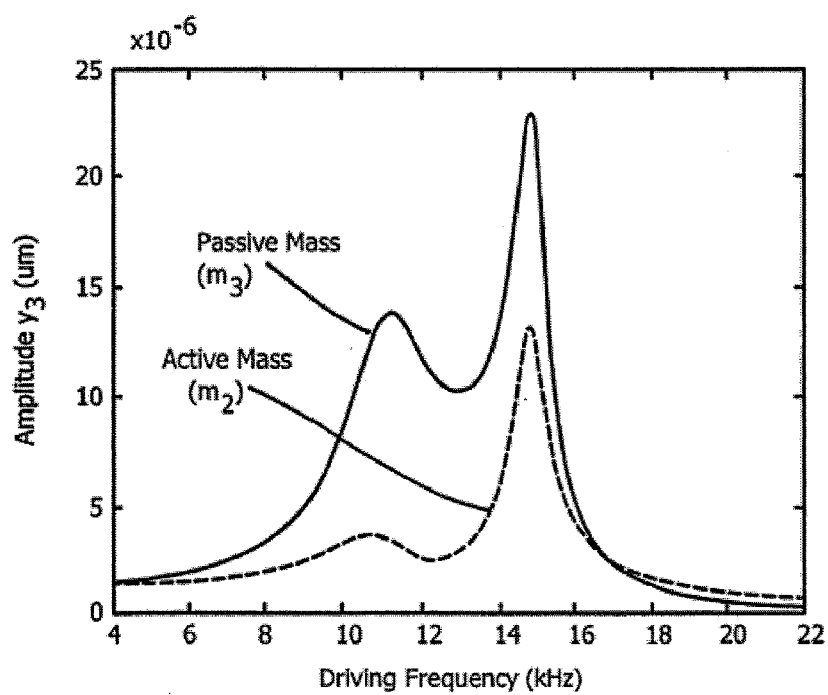
FIG. 6(b) is a graph of the $y_3$ amplitudes as a function of driving frequency of the sense-mode oscillator.

The response of the system to a constant-amplitude sinusoidal force is similar to that of the drive-mode oscillator as illustrated in the graph of FIG. 6(b), with the resonant frequencies of the isolated active and passive mass-spring systems of $\Omega_{2y}=(k_{2y}/m_2)^{1/2}$ and $\omega_{3y}=(k_{3y}/m_3)^{1/2}$ respectively. When the frequency of the sinusoidal Coriolis force is matched with the resonant frequency of the isolated passive mass-spring system 40, the passive mass 20 achieves maximum dynamic amplification.

The most important advantage of decoupling the 2-DOF drive oscillator 12 and sense-mode oscillator 36 is that the Coriolis force that excites the sensing element 20 is not generated by the sensing element 20. Instead, $F_{c2}=2m_2\omega_z dx_2/dt$ generated by mass 18 excites the active mass 20. The dynamics of the 2-DOF oscillator dictates that the passive mass 20 has to be minimized in order to maximize its oscillation amplitude. Since the Coriolis Force $F_{c3}=2\omega_z dx_2/dt$ generated by mass 20 is not required to be large, the sensing element 20 can be designed to be as small as the mechanical design requirements and fabrication parameters allow.

Similarly, the optimal mass ratio $\mu_y=m_3/m_2$ in the sense direction determining the mass of the active mass 18 is selected to achieve insensitivity to damping variation, a wide response bandwidth and a large oscillation amplitude. The optimal ratio of the resonance frequencies of the isolated active system involving mass 20 and passive mass-spring system involving mass 18, $y^y=\omega_{3y}/\omega_{2y}=(k_{3y}m_2/k_{2y}m_3)^{1/2}$ is also selected to maximize oscillation amplitudes of passive mass 20.

3) Overall System Parameters:

The frequency response of both of the drive oscillator 12 and sense-mode oscillators 14 have two resonant peaks and a flat region between the peaks. To achieve maximum robustness against fluctuations in the system parameters, both of the oscillators 12 and 14 have to be operated in the flat region of their response curves. Since the Coriolis forces that drive the sense-direction oscillator 14 are at the same frequency as the electrostatic forces exciting the drive-direction oscillator 12, the flat-region frequency band of the oscillators 12 and 14 have to be overlapped, by designing the drive and sense anti-resonance frequencies to match. Thus, the requirement $\omega_{3y}=\omega_{2x}$, i.e., $(k_{3y}/m_3)^{1/2}=(k_{2x}/(m_2+m_3))^{1/2}$ determines the optimal system parameters, together with the optimized ratios $\mu_x=(m_2+m_3)/m_1$, $Y_x=\omega_{2x}/\omega_{1x}$, $\mu_y=m_3/m_2$, and $Y_y=\omega_{3y}/\omega_{2y}$. Since the flat regions have significantly wider bandwidths, they can be overlapped with sufficient precision without feedback control in the presence of imperfections, in contrast to the conventional gyroscopes.

Exciting the drive-direction oscillator 12 at its anti-resonance frequency results in minimal oscillation amplitudes of the electrostatically driven mass as illustrated in the graph of FIG. 6(a). Thus, by minimizing the travel distance of the actuators, higher actuation stability and linearity is achieved by means of mechanical amplification. Also, since the sense-direction oscillator 14 is excited at its anti-resonance frequency, the sense-direction oscillation amplitude of is minimized as illustrated in the graph of FIG. 6(b). This results in a minimal coupling between the oscillation modes, leading to reduced zero-rate drift of the gyroscope.

In summary, a nonresonant micromachined gyroscope design concept is disclosed, which eliminates the mode-matching requirement, and minimizes instability and zero-rate drift due to mechanical coupling between the drive and sense modes. The proposed approach is based on forming mechanically decoupled drive-mode oscillator 12 and DOF sense-mode oscillator 14 using three interconnected proof masses 16, 18 and 20. The overall system 10 utilizes dynamical amplification in the drive and sense directions to achieve large oscillation amplitudes without resonance resulting in increased bandwidth and reduced sensitivity to structural and thermal parameter fluctuations and damping changes, while mechanically decoupling the drive direction oscillations from the sense direction oscillations leads to improved robustness and long-term stability over the operating time of the device. Furthermore, employing three proof masses 16, 18 and 20 to form the decoupled oscillators 12 and 14 allows the Coriolis force that excites the sensing element to be generated by a larger intermediate proof mass, resulting in larger Coriolis forces for increased sensor sensitivity. Thus, the design concept, which provides improved robustness and stability with minimal compromise in performance, is relaxes control system requirements and tight fabrication and packaging tolerances.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A micromachined gyroscope adapted to operate in a nonresonant mode, comprising:
    a drive-mode oscillator; and
    a sense-mode oscillator,
    wherein the drive-mode oscillator comprises three interconnected oscillating masses capable of moving in a drive direction, and the sense-mode oscillator comprises two masses out of the three interconnected oscillating masses capable of moving in an orthogonal sense direction, and
    where the oscillation in the drive direction of one of the masses of the drive-mode oscillator is mechanically constrained to the drive direction and where the relative oscillation of the masses of the sense-mode oscillator is mechanically constrained to the sense direction, so that the one mass of the drive-mode oscillator is dynamically decoupled from one mass of the sense-mode oscillator.

2. The micromachined gyroscope of claim 1, wherein the drive-mode oscillator and sense-mode oscillator are each characterized by a frequency response curve having a flat nonresonant region, where the drive mode oscillator is capable of being operated within the flat nonresonant region of the drive frequency response curve, and where the sense mode oscillator is capable of being operated within the flat nonresonant region of the sense frequency response curve with a maximized operational oscillation amplitudes at the frequency of operation.

3. The micromachined gyroscope of claim 1,
    wherein at least one of the three masses is included in an intermediate mass and another one of the three masses is a sensing element, wherein the intermediate mass is larger than the sensing element, and
    wherein flexures in the drive-mode oscillator and sense-mode oscillator are physically configured so that only Coriolis excitations without additional drive excitations are capable of being coupled into the sense-mode oscillator, so that a Coriolis force generated by means of the larger intermediate mass results in a corresponding larger Coriolis force being transferred to the sensing element for increased sensitivity.

4. The micromachined gyroscope of claim 1,
    wherein the drive-mode oscillator and sense-mode oscillator include a drive means for driving a mass in a drive direction and a sense means for sensing motion of a mass in a sense direction, and
    wherein the three interconnected masses comprise a first mass, a second mass and a third mass, the first mass being the only mass directly excited by the drive means, the first mass oscillating in the drive direction and the first mass being constrained from movement in the sense direction, the second and third masses being constrained from movement with respect to each other in the drive direction and oscillating together in the drive direction but oscillating independently from each other in the sense direction, the third mass being fixed with respect to the second mass in the drive direction, but free to oscillate in the sense direction with respect to the second mass, the drive-mode oscillator comprising the three interconnected masses, the second and third masses comprising the sense-mode oscillator.

5. The micromachined gyroscope of claim 4,
wherein the second mass oscillates in the drive and sense directions to generate a rotation-induced force that excites the sense-mode oscillator, and
wherein a sense direction response of the third mass, which acts as a vibration absorber of the sense-mode oscillator, is detected for measuring an input angular rate.

6. The micromachined gyroscope of claim 1, further comprising a substrate on which the drive-mode oscillator and sense-mode oscillator are disposed,
wherein the three interconnected masses comprise a first mass, a second mass and a third mass, wherein the first mass is anchored to the substrate by a first flexure that allows movement substantially only in the drive direction, wherein the second mass is coupled to the first mass by a second flexure that allows movement in the drive and the sense directions, and wherein the third mass is coupled to the second mass by a third flexure that allows movement relative to the second mass substantially only in the sense direction, and
wherein the drive-mode oscillator and the sense-mode oscillator comprise a drive means for driving the first mass, the second mass and the third mass in a drive direction, a sense means for sensing motion of the third mass in a sense direction.

7. The micromachined gyroscope of claim 6, wherein the first and third flexures are folded micromachined springs having a resiliency substantially in only a first direction and wherein the second flexure is comprised of two coupled folded micromachined springs, one of the two coupled folded micromachined springs having a resiliency substantially in only one of the first and a second direction orthogonal to the first direction and the other one of the two coupled folded micromachined springs having a resiliency substantially in only the other one of the first and second directions.

8. The micromachined gyroscope of claim 1, wherein the drive-mode oscillator and the sense-mode oscillator are structurally arranged and configured such that the drive-mode oscillator and sense-mode oscillator together collectively comprise a gyroscope each having a frequency response curve with two resonant peaks and a flat region between the two peaks, the flat regions of the drive-mode and sense-mode oscillator overlapping each other, the gyroscope capable of being operated at a frequency in the overlapping flat regions of the frequency response curves.

9. The micromachined gyroscope of claim 8,
wherein the drive-mode oscillator has a drive direction anti-resonance frequency, wherein the sense-mode oscillator has a sense direction anti-resonance frequency, and
wherein the drive-mode oscillator and the sense mode oscillator are arranged and configured to have matching anti-resonance frequencies.

10. The micromachined gyroscope of claim 1,
wherein the three interconnected masses comprise a first mass, a second mass, a third mass, and coupled flexures,
wherein the first mass oscillates, the second and the third masses combining to comprise a vibration absorber of the drive-mode oscillator, which vibration absorber mechanically absorbs the oscillations of the first mass to result in larger oscillations of the second and third masses than the first mass, and
wherein the drive-mode oscillator and the sense-mode oscillator further comprise a drive means for driving the first mass, the second mass and the third mass in a drive direction, and a sense means for sensing motion of the third mass in a sense direction.

11. The micromachined gyroscope of claim 10, wherein the first mass is driven at a driving frequency, $\omega_{drive}$, by means of an input force $F_d$, which driving frequency, $\omega_{drive}$, is matched with a resonant frequency of an isolated mass-spring system comprised of the second and third masses and coupled flexures, which mass-spring system is in resonance with the first mass, so that maximum dynamic motion of at least one of the three interconnected masses is achieved.

12. The micromachined gyroscope of claim 1,
wherein the third mass absorbs vibrations such that the sense-mode oscillator achieves increased sense direction oscillation amplitudes, and
wherein the drive-mode oscillator and the sense-mode oscillator further comprise a drive means for driving the first mass, the second mass and the third mass in a drive direction, and a sense means for sensing motion of the third mass in a sense direction; and
wherein the third mass absorbs sense direction oscillations and is capable of achieving greater sense direction oscillation amplitudes due to application of a larger Coriolis force coupled to the third mass from the second mass than would have been applied to the third mass without coupling to the second mass in the sense direction.

13. The micromachined gyroscope of claim 12,
wherein the third mass comprises an isolated mass-spring system, and wherein a Coriolis force is induced on the second mass, and
wherein the frequency of the Coriolis force is matched with a resonant frequency of the isolated mass-spring system of the third mass and its coupled flexures, so that the third mass achieves maximum motion.

14. The micromachined gyroscope of claim 1:
wherein the drive-mode oscillator comprises a drive means for driving the three interconnected masses in a drive direction, and the sense-mode oscillator comprises a sense means for sensing motion of one of the three interconnected masses in a sense direction,
wherein the three interconnected masses comprise a first mass, a second mass, a third mass, and flexures coupled to each of the first, second and third masses, wherein the drive-mode oscillator and the sense-mode oscillator each have a frequency response defined by a response curve,
wherein each of the frequency responses of both the drive-mode oscillator and sense-mode oscillator has two resonant peaks and a flat region of the response curve between the peaks,
wherein both of the drive-mode oscillator and the sense-mode oscillator are operated in the flat region of their respective response curves between the peaks of the respective response curve,
wherein the second mass has a drive anti-resonance frequency, $\omega_{2x}$, and the third mass has a sense anti-resonance frequency, $\omega_{3y}$, and
wherein $\omega_{2x}$, and $\omega_{3y}$ are matched, namely where $\omega_{3y}=\omega_{2x}$, or equivalently $(k_{3y}/m_3)^{1/2}=(k_{2x}/(m_2+m_3))^{1/2}$ determines maximized operational system parameters, together with the maximized operational ratios $\mu_x=(m_2+m_3)/m_1$, $y_x=\omega_{2x}/\omega_{1x}$, $\mu_y=m_3/m_2$, and $Y_y=\omega_{3y}/\omega_{2y}$, where $k_{3y}$ is a spring constant of the flexures coupled to the third mass, where $m_3$ is a magnitude of the third mass, $k_{2x}$ is a spring constant of the flexures coupled to the second mass, $m_2$ is a magnitude of the second mass, $\omega_{1x}$ is the drive anti-resonance frequency of the first mass, and $\omega_{2y}$ is the sense anti-resonance frequency of the second mass.

15. A method of nonresonantly operating a micromachined gyroscope formed in a substrate comprising:

oscillating in a drive direction a drive-mode oscillator with an applied force;

oscillating in a sense direction a sense-mode oscillator with a Coriolis force derived from the drive-mode oscillator; and wherein oscillating the drive-mode oscillator comprises oscillating relative to the substrate three interconnected masses in the drive direction, and wherein oscillating the sense-mode oscillator comprises oscillating relative to the substrate two masses out of the three interconnected masses in the sense direction as sense masses, where oscillating the three interconnected masses of the drive-mode oscillator further comprises mechanically constraining oscillation relative to the substrate of one of the three interconnected masses to the drive direction and where oscillating the two masses out of the three interconnected masses comprises mechanically constraining relative motion of the two masses with respect to each other to the sense direction, so that oscillation in the drive direction with respect to the substrate of the one constrained mass of the drive-mode oscillator is dynamically decoupled from relative oscillation in the sense direction of the two masses.

16. The method of claim 15, wherein driving the drive-mode oscillator and driving the sense-mode oscillator are capable of dynamically increasing a motion of at least one of the three interconnected masses to achieve increased oscillation amplitudes without resonance to result in an increased operational frequency range and reduced sensitivity to structural and thermal parameter fluctuations and damping changes.

17. The method of claim 15 wherein oscillating in a sense direction a sense-mode oscillator with a Coriolis force derived from the drive-mode oscillator comprises exciting a sense mass in the sense-mode oscillator by a force arising from one of the three interconnected masses employed in both the drive-mode and sense mode oscillators, wherein the mass employed in both the drive-mode and sense-mode oscillators is a substantially larger mass than the other of the two interconnected masses used as a sense mass, resulting in increased sensitivity of the gyroscope.

18. The method of claim 15, wherein driving the drive-mode oscillator comprises driving a first, second and third masses in a drive direction with a drive means, and driving the sense-mode oscillator comprises driving second and third a mass in a sense direction by exciting the first mass only by the drive means, by causing the first mass to oscillate in the drive direction with a driving force and by constraining movement of the first mass from the sense direction, by constraining movement of the second and third masses with respect to each other from the drive direction, causing the second and third masses to oscillate together in the drive direction but causing the second and third masses to oscillate independently from each other in the sense direction, by fixing the third mass with respect to the second mass in the drive direction, and by causing the third mass to oscillate in the sense direction by means of a Coriolis force only.

19. The method of claim 18, wherein causing the second mass to oscillate in the drive and sense directions excites the sense-mode oscillator through the Coriolis force, and further comprising detecting a sense direction response of the third mass, which acts as a vibration absorber of the sense-mode oscillator for measuring an input angular rate.

20. The method of claim 15, wherein the three interconnected masses comprise a first mass, a second mass and a third mass, and wherein the drive-mode oscillator comprises a drive means for driving a mass in a drive direction and the sense-mode oscillator comprises a sense means for sensing motion of the third mass in a sense direction, and a substrate on which the drive-mode oscillator and the sense-mode oscillator are disposed, the method further comprising anchoring the first mass to the substrate by a first flexure and moving the first mass substantially only in the drive direction, moving the second mass coupled to the first mass by means of transferring force through a second flexure in the drive and the sense directions, and moving the third mass coupled to the second mass by means of transferring force through a third flexure substantially only in the sense direction.

21. The method of claim 20, wherein coupling the first mass to the substrate by the first flexure comprises coupling the first mass using a folded micromachined spring having a resiliency substantially in only the drive direction, and wherein moving the third mass by means of the third flexure uses two coupled folded micromachined springs, one of the two coupled folded micromachined springs having a resiliency substantially in only the drive direction, and the other one of the two coupled folded micromachined springs having a resiliency substantially in only the sense direction.

22. The method of claim 15, wherein the drive-mode oscillator and sense-mode oscillator are structurally arranged and configured to have the flat regions of their respective frequency response curves at least partially overlapping to define a common flat region, the gyroscope of operating in the common flat regions of response curves of the drive-mode and sense-mode oscillators between two resonant peaks in the response curves.

23. The method of claim 22, further comprising matching an anti-resonance drive frequency of the drive-mode oscillator with an anti-resonance sense frequency of the sense-mode oscillator.

24. The method of claim 15, wherein the three interconnected masses comprise a first mass, a second mass, a third mass, and coupled flexures, the second and the third masses combining to comprise a vibration absorber of the drive-mode oscillator, the method further comprising mechanically absorbing the oscillations of the first mass by means of the vibration absorber and generating oscillations of at least a portion of the vibration absorber at a greater oscillation amplitude, wherein the drive-mode oscillator and the sense-mode oscillator comprise a drive means for driving the first mass, the second mass, and the third mass in a drive direction, and a sense means for sensing a motion of the third mass in a sense direction.

25. The method of claim 24, further comprising driving the first mass at a driving frequency, $\omega_{drive}$, by means of an input force $F_d$, matching the driving frequency, $\omega_{drive}$, with a resonant frequency of an isolated mass-spring system comprised of the second and third masses and coupled flexures, and moving the isolated mass-spring system in resonance with the first mass, so that a maximized dynamic response of the second motion to the first motion is achieved.

26. The method of claim 15,
wherein driving the drive-mode oscillator comprises driving three interconnected masses in a drive direction and driving the sense-mode oscillator comprises driving motion of one of the three interconnected masses in a sense direction, and
wherein driving the drive-mode oscillator comprises driving three interconnected masses in a drive direction and driving the sense-mode oscillator comprises mechanically increasing sense direction oscillation amplitudes in a vibration absorber in the sense-mode oscillator.

27. The method of claim 26, wherein the three interconnected masses comprise a first mass, a second mass, and a third mass, the method further comprising:
applying a Coriolis force to the second mass, and
matching the frequency of the Coriolis force with a resonant frequency of an isolated mass-spring system comprised of the third mass and its coupled flexures, so that the third mass achieves a maximized dynamic increase in its oscillation amplitudes.

28. The method of claim 15,
wherein driving the drive-mode oscillator comprises driving a first, second and third mass in a drive direction, and driving the sense-mode oscillator comprises driving the second mass in a sense direction, and sensing motion of the third mass in the sense direction, wherein the drive-mode oscillator and sense-mode oscillator each have a frequency response defined by a response curve, wherein the frequency response of both the drive-mode oscillator and sense-mode oscillator have two resonant peaks and a flat region of the response curve between the peaks, operating both the drive-mode oscillator and sense-mode oscillator in the flat region of their response curves, wherein the second mass has a drive anti-resonance frequency, $\omega_{2x}$, and the third mass has a sense anti-resonance frequency, $\omega_{3y}$, and matching $\omega_{2x}$ and $\omega_{3y}$, namely setting $\omega_{3y}=\omega_{2x}$, or equivalently $(k_{3y}/m_3)^{1/2}=(k_{2x}/(m_2+m_3))^{1/2}$ and determining therefrom maximized system parameters, together with the optimized ratios $\mu_x=(m_2+m_3)/m_1$, $y_x=\omega_{2x}/\omega_{1x}$, $\mu_y=m_3/m_2$, and $y_y=\omega_{3y}/\omega_{2y}$, wherein $k_{3y}$ is a spring constant of the flexures coupled to the third mass, $m_3$ is a magnitude of the third mass, $k_{2x}$ is a spring constant of the flexures coupled to the second mass, $m_2$ is a magnitude of the second mass, $\omega_{1x}$ is a drive anti-resonance frequency of the first mass, and $\omega_{2y}$ is a sense anti-resonance frequency of the second mass.

* * * * *